S. BACHER.
BEARING BOLT FOR PLOW COLTERS AND THE LIKE.
APPLICATION FILED APR. 16, 1915.
1,166,309.  Patented Dec. 28, 1915.
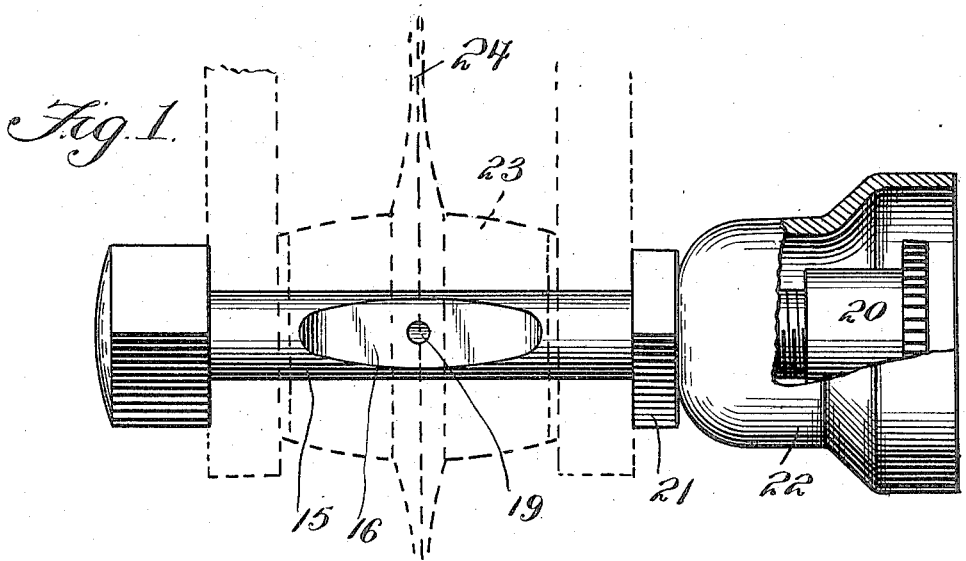
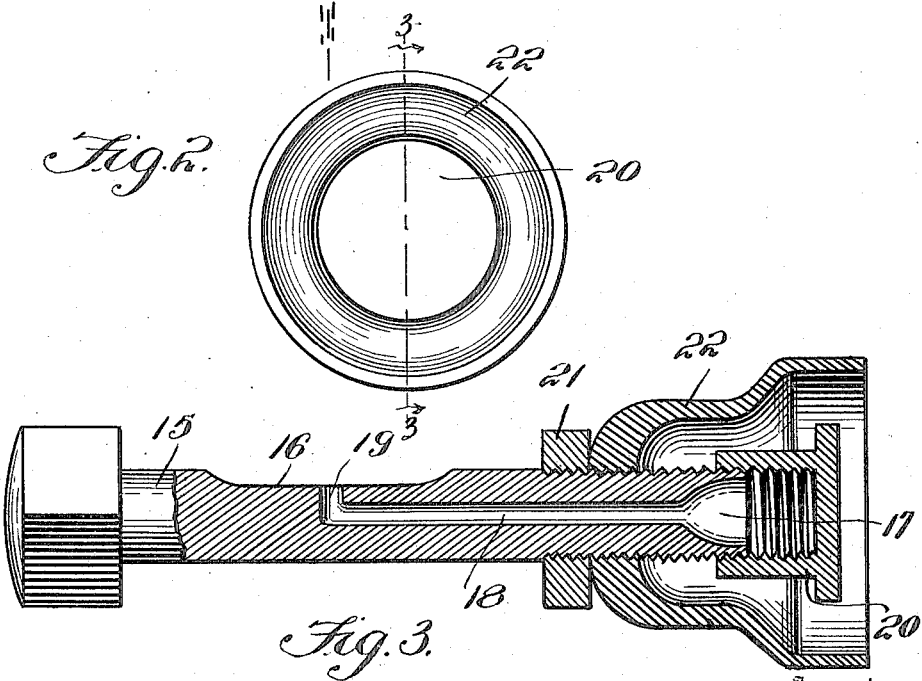
Inventor
Solomon Bacher
By Victor J. Evans
Attorney
Witnesses

UNITED STATES PATENT OFFICE.

SOLOMON BACHER, OF WOLFORD, NORTH DAKOTA.

BEARING-BOLT FOR PLOW-COLTERS AND THE LIKE.

1,166,309. Specification of Letters Patent. Patented Dec. 28, 1915.

Application filed April 16, 1915. Serial No. 21,908.

*To all whom it may concern:*

Be it known that I, SOLOMON BACHER, a citizen of the United States, residing at Wolford, in the county of Pierce and State of North Dakota, have invented new and useful Improvements in Bearing-Bolts for Plow-Colters and the like, of which the following is a specification.

This invention relates to bolts or bearing members for rotary plow colters and the like.

The invention has for its object to produce a self lubricating bolt or bearing member of simple and improved construction.

A further object of the invention is to produce a self-lubricating bolt having a cap or container for hard oil and a protecting member for the same.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a side view of the improved bolt or bearing member and related parts assembled. Fig. 2 is a front view of the same. Fig. 3 is a longitudinal sectional view taken on the line 3—3 in Fig. 2.

Corresponding parts in the several figures are denoted by like characters of reference.

The bolt 15 is provided with a flattened portion forming an elongated recess 16. The bolt is provided at its threaded end with a cup-shaped recess 17 from which a bore 18 extends longitudinally through the bolt, said bore being connected by a transverse opening 19 with the recess 16. Threaded upon the end of the bolt is a cap 20 which constitutes a lubricant receptacle, hard oil being the lubricant preferably employed. The bolt is equipped with a nut 21, and threaded on said bolt between the nut and the cup or receptacle 20 is a cup-shaped or funnel-shaped member 22 which surrounds the oil cup and forms a protector for the same. Said member, by screwing the same down tightly against the face of the nut 21, will also constitute a locking device for said nut.

The bolt 15, in practice, may constitute a bearing for a revoluble member, such as a sleeve or hub indicated in dotted lines at 23 and carrying an element, such as a colter disk, a portion of which is indicated at 24. An extended portion of the bearing will be lubricated by lubricating material supplied through the bore 18 to the recess 16 from the cup or receptacle 20, and by moving the latter in the direction of the head of the bolt, the lubricant may be supplied at the desired rate. The lubricant cup is protected by the funnel-shaped member 22, and the latter may be utilized as a locking device for the nut 21.

Having thus described the invention, what is claimed as new, is:—

A bearing bolt having an elongated recess, a duct connecting said recess with the extremity of the threaded end of the bolt, a nut on said bolt, a funnel shaped protecting device threaded upon the bolt and adapted to engage the nut to lock the latter, and a lubricant cup in threaded engagement with the bolt and surrounded by the funnel-shaped protecting device.

In testimony whereof I affix my signature in presence of two witnesses.

SOLOMON BACHER.

Witnesses:
R. H. SUGDEN,
H. D. LUTZ.

Copies of this patent may be obtained for five cents each, by addressing the "Commissioner of Patents, Washington, D. C."